(12) United States Patent
Acero et al.

(10) Patent No.: US 7,885,812 B2
(45) Date of Patent: Feb. 8, 2011

(54) JOINT TRAINING OF FEATURE EXTRACTION AND ACOUSTIC MODEL PARAMETERS FOR SPEECH RECOGNITION

(75) Inventors: Alejandro Acero, Bellevue, WA (US); James G. Droppo, Duvall, WA (US); Milind V. Mahajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 11/560,180

(22) Filed: Nov. 15, 2006

(65) Prior Publication Data

US 2008/0114596 A1 May 15, 2008

(51) Int. Cl.
*G10L 15/06* (2006.01)
(52) U.S. Cl. .................. 704/244; 704/243; 704/251
(58) Field of Classification Search ............ 704/244, 704/243, 251
See application file for complete search history.

(56) References Cited

U.S. PATENT DOCUMENTS

| 5,274,739 | A | * | 12/1993 | Woodard ................. 704/256.8 |
| 5,615,299 | A | * | 3/1997 | Bahl et al. .................. 704/254 |
| 6,490,555 | B1 | * | 12/2002 | Yegnanarayanan et al. .. 704/231 |
| 6,865,531 | B1 | * | 3/2005 | Huang ........................ 704/226 |
| 6,937,981 | B2 | * | 8/2005 | Seo et al. .................... 704/246 |
| 2003/0055640 | A1 | * | 3/2003 | Burshtein et al. ........... 704/235 |
| 2004/0267530 | A1 | * | 12/2004 | He et al. ..................... 704/256 |
| 2007/0083373 | A1 | * | 4/2007 | Liu et al. ................. 704/256.2 |

OTHER PUBLICATIONS

Rabiner, L. "A Tutorial on Hidden Markov Models and Selected Applications in Speech Recognition." Proceedings of the IEEE vol. 77 No. 2, p. 257-286, Feb. 1989.*
Y. LeChen, L. Bottou, Y. Bengio and P. Haffner, "Gradient-based learning applied to document recognition," Proc. IEEE, vol. 86, No. 11, pp. 2278-2324, 1998.
Y. Bengio, r. De Mori, G. Flammia, and R. Kompe, "Global optimization of a neural network-hidden Markov model hybrid" IEEE Trans. on Neural Networks, vol. 3, No. 2, pp. 252-259, 1992.
J. Droppo, L. Deng, and A. Acero, "Evaluation of SPLICE on the Aurora 2 and 3 tasks" in Proc ICSLP, 2002, pp. 29-32.
M. Riedmiller and H. braun, "a direct adaptive method for faster backpropagation learning: The RPROP algorithm" in IEEE Int. Conf. On Neural Networks, 1993, vol. 1, pp. 586-591.
D. Macho, L. Mauuary, B. Noe, Y.M. Cheng, D. Ealey, D. Jouvest, H. Kelleher, D. Pearce and F. Saadoun, "Evaluation of a noise-robust DSR front-end on Aurora databases" in Proc. ICSLP, 2002, pp 17-20.
J. Le Roux and E. McDermott, "Optimization methods for discriminative training" in Proc. Eurospeech, 2005, pp. 3341-3345.

(Continued)

*Primary Examiner*—Talivaldis Ivars Smits
*Assistant Examiner*—Shaun Roberts
(74) *Attorney, Agent, or Firm*—Christopher J. Volkmann; Westman, Champlin & Kelly, P.A.

(57) ABSTRACT

Parameters for a feature extractor and acoustic model of a speech recognition module are trained. An objective function is utilized to determine values for the feature extractor parameters and the acoustic model parameters.

12 Claims, 4 Drawing Sheets

OTHER PUBLICATIONS

D. Ellis and M. Gomez, "Investigations into tandem acoustic modeling for the Aurora task" in Proc. Eurospeech, 2001, pp. 189-192.

J. Droppo, M. Mahajan, A. Gunawardana and A. Acero, "How to train a discriminative front end with stochastic gradient descent and maximum mutual information" in Proc. IEEE ASRU, 2005.

H.G. Hirsch and D. Pearce, "The Aurora experimental framework for the performance evaluations of speech recognition systems under noisy conditions" in ISCA ITRW ASR2000, 2000.

A. de la Torre, J.C. Segura, C. Segura, C. Benitez, A. Peinado and a.J. Rubio, "Nonlinear transformations of the feature space for robust speech recognition" in Proc. ICASSP, 2002, vol. 1, pp. 401-404.

* cited by examiner

JOINT TRAINING OF FEATURE EXTRACTION AND ACOUSTIC MODEL PARAMETERS FOR SPEECH RECOGNITION

BACKGROUND

A pattern recognition system, such as a speech recognition system, takes an input signal and attempts to decode the signal to find a pattern represented by the signal. For example, in a speech recognition system, a speech signal is received by the recognition system and is decoded to identify a string of words represented by the speech signal.

Acoustic processing in current speech recognition systems includes two parts: a front end that extracts acoustic features of the signal and a back end acoustic model that scores hypotheses of sequences based on the acoustic features. Training of parameters that define the front end and back end are done separately, which can lead to a less than optimal speech recognition system.

The discussion above is merely provided for general background information and is not intended to be used as an aid in determining the scope of the claimed subject matter.

SUMMARY

Parameters for a feature extractor and acoustic model of a speech recognition module are trained. An objective function is utilized to determine values for the feature extractor parameters and the acoustic model parameters. The objective function can be determined as a function of a probability of a correct output from the speech recognition given an audio signal.

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION

Figure 1:
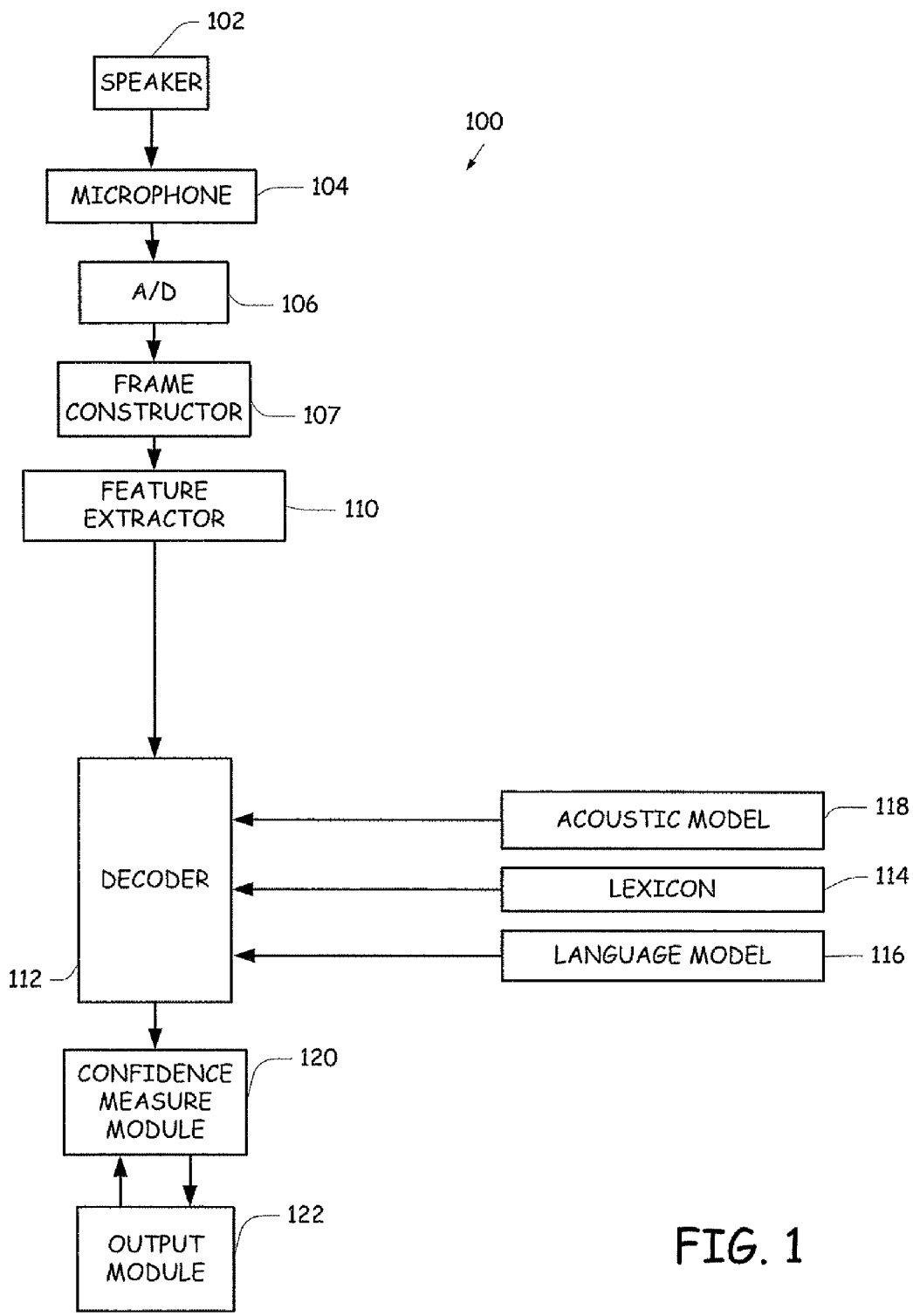
Figure 2:
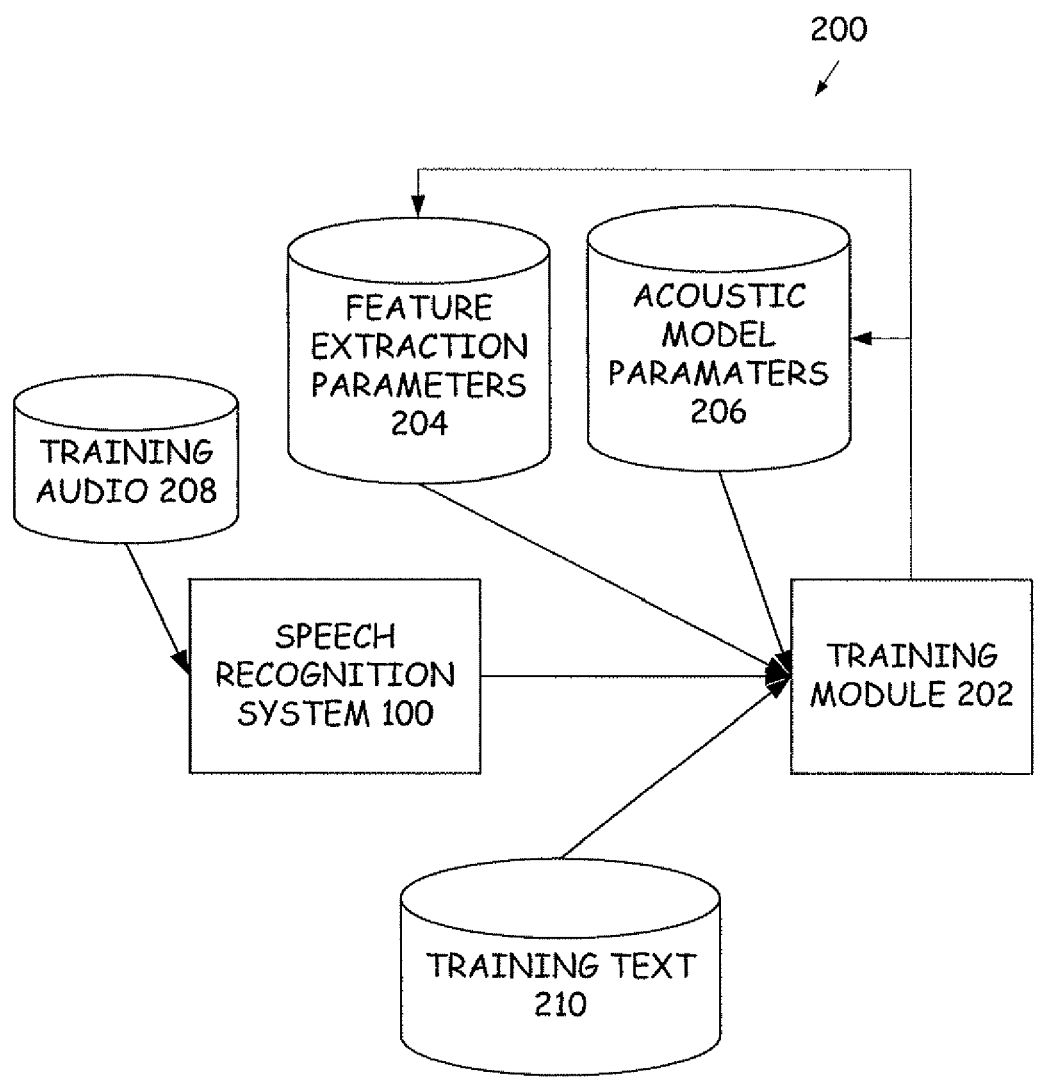
Figure 3:
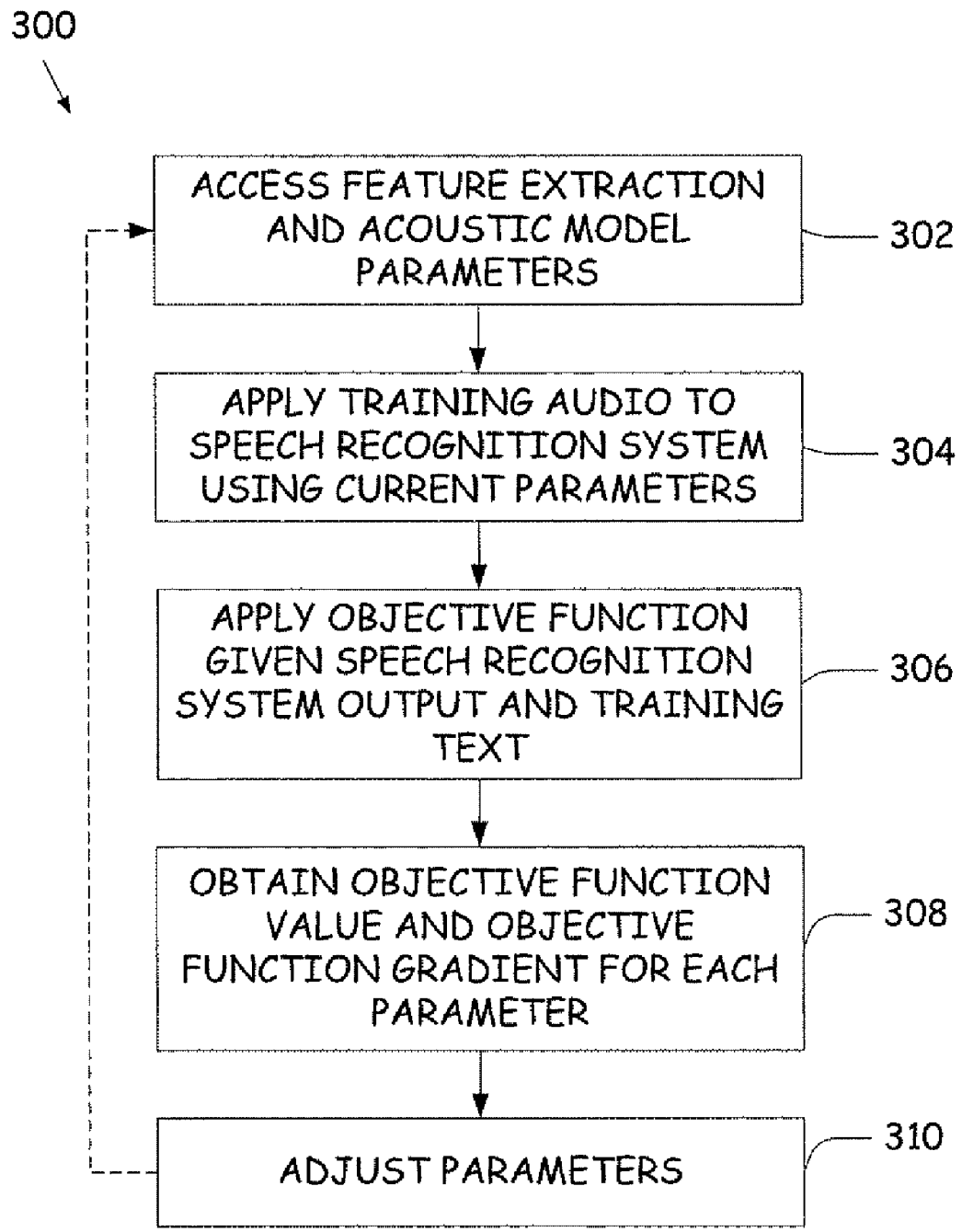
Figure 4:
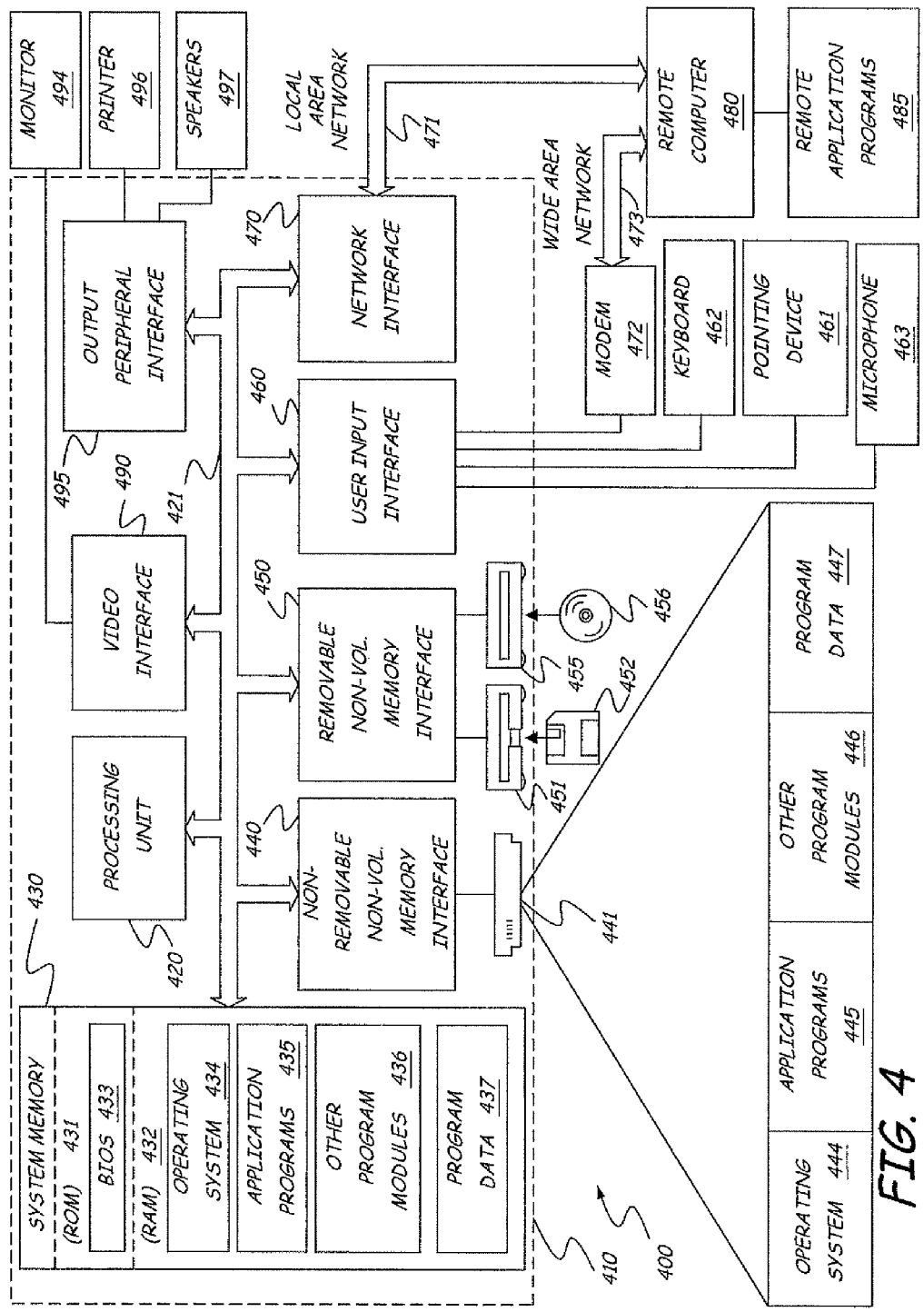

FIG. 1 is a block diagram of a speech recognition system.
FIG. 2 is a block diagram of a parameter training system.
FIG. 3 is a flow diagram of a method for training parameters.
FIG. 4 is a block diagram of a general computing environment.

DETAILED DESCRIPTION

FIG. 1 is a block diagram of a speech recognition system 100. In FIG. 1, a speaker 102, either a trainer or a user, speaks into a microphone 104. The audio signals detected by microphone 104 are converted into electrical signals that are provided to analog-to-digital converter 106.

A-to-D converter 106 converts the analog signal from microphone 104 into a series of digital values. In several embodiments, A-to-D converter 106 samples the analog signal at 16 kHz and 16 bits per sample, thereby creating 32 kilobytes of speech data per second. These digital values are provided to a frame constructor 107, which, in one embodiment, groups the values into 25 millisecond frames that start 10 milliseconds apart.

The frames of data created by frame constructor 107 are provided to feature extractor 110, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that system 100 is not limited to these feature extraction modules and that other modules may be used. The feature extractor 110 produces a stream of feature vectors that are each associated with a frame of the speech signal.

Feature extractor 110 provides feature vectors to a decoder 112, which identifies a most likely sequence of words based on the stream of feature vectors, a lexicon 114, a language model 116, and an acoustic model 118. The particular method used for decoding is not important to system 100 and any of several known methods for decoding may be used.

The most probable sequence of hypothesis words is provided to a confidence measure module 120. Confidence measure module 120 identifies which words are most likely to have been improperly identified by the speech recognizer, based in part on a secondary acoustic model (not shown). Confidence measure module 120 then provides the sequence of hypothesis words to an output module 122 along with identifiers indicating which words may have been improperly identified. Those skilled in the art will recognize that confidence measure module 120 is not necessary for system 100.

FIG. 2 is a block diagram of a system 200 to jointly train parameters of feature extractor 110 and acoustic model 118. System 200 includes a training module 202 that is utilized to optimize feature extraction parameters 204 and acoustic model parameters 206 for feature extractor 110 and acoustic model 118, respectively. Training module 202 uses output from speech recognition system 100 based on training audio 208 and training text 210 to train the parameters.

In one embodiment, the feature extraction parameters 204 pass through a SPLICE (stereo piecewise linear compensation for environment) transform. Given enough parameters, SPLICE can approximate feature transformations to an arbitrary precision. Acoustic model parameters 206 can include various acoustic model parameters.

Training module 202, in one example, utilizes a maximum mutual information (MMI) objective function. Other discriminative training objective functions can also be utilized.

The MMI objective function can be represented as a sum of log conditional probabilities for all correct transcriptions, $w_r$ of utterance given corresponding acoustics $Y_r$.

$$F = \sum_r F_r = \sum \ln p(w_r | Y_r) \qquad (1)$$

To derive $p(w_r|Y_r)$, both sets of parameters for acoustic processing are considered: the front end transformation performed by feature extractor 110 and the back end acoustic score provided by acoustic model 118. One example front end feature transformation $X_r = f(y_r; \lambda)$ is parameterized by $\lambda$ and converts the rth input sequence $Y_r$ into the feature vector sequence $X_r$. One example back end acoustic score $p(X_r, w; \theta)$ defines a joint probability distribution over feature sequences $X_r$ and transcriptions $w$ using the parameters $\theta$.

Using these definitions and a rule for representing mutual information of correct transcriptions given an utterance, the objective function can be represented as:

$$F = \sum_r \ln \frac{p(f(Y_r; \lambda), w_r; \theta) J_f(Y_r)}{\sum_w p(f(Y_r; \lambda), w; \theta) J_f(Y_r)}. \qquad (2)$$

Where, $J_f(Y_r)$ is the Jacobian (a matrix of all first-order partial derivatives of a vector valued function) of the transformation $\theta(Y_r; \lambda)$, evaluated at $Y_r$. When this Jacobian is nonzero, it can be cancelled from Eq. 2.

Since exact optimization of Eq. 2 can be resource intensive, the probabilities $p(X_r, w; \theta)$ can be approximated on word lattices generated by an acoustic model. The numerator in Eq. 2 calculated over the best path that corresponds with the correct transcription, and the denominator is calculated over all paths in the lattice.

As can be done in lattice-based MMI estimation, the objective function can also be modified to include posterior flattening, with time marks in the lattices held fixed, and forward-backward techniques can be used within each arc to determine arc conditional posterior probabilities.

FIG. 3 is a flow diagram of a method 300 for training feature extraction parameters 204 and acoustic model parameters 206 using an objective function utilized by training module 202. At step 302, the feature extraction parameters 204 and acoustic model parameters 206 are accessed by training module 202. At step 304, training audio 208 is applied to speech recognition system 100.

Given the output from speech recognition system 100 and training text 210, the objective function is applied at step 308. The objective function value and gradients for each parameter are obtained at step 308. Based on the objective function value and the gradients, the feature extraction parameters 204 and the acoustic model parameters 206 are adjusted at step 310. Method 300 can be repeated using the adjusted parameters until a desired value for all parameters is found.

A scale of step size $\Delta_i$ for adjustment of the parameters can be separate from the magnitude of the current gradient $$\frac{\partial F}{\partial \lambda_i}.$$

In one example, a range of $\Delta min=10^{-5}$ and $\Delta max=0.1$ can be used to bound the step size within a reasonable range. At each iteration through method 300, adjustments can be made based on the gradients for every parameter. If the current and previous gradient are in the same direction (d>0), the step size $\Delta_i$ is increased and applied in the same direction as the current gradient.

If the current and previous gradient are in opposite directions (d>0), it means that a local maximum has been overshot. In this case, the step size is reduced and the parameter is reset to its value before the last update. Also, the memory of the current gradient is set to zero. This serves as a flag for the next iteration of method 300.

If either the current or previous gradient are zero, then d=0 and the current step size is applied in the direction of the current gradient. This situation is appropriate whether the current gradient is zero and a local maximum has been found, or the previous gradient is zero, indicating that the algorithm had overshot and backtracked during the previous iteration.

To train the back end acoustic model parameters 208, a partial derivative of the objective function $F_r$ with respect to these parameters can be computed. Every $F_r$ is a function of many acoustic model state conditional probabilities $p(\chi_1^r | s_t^r)$, which are in turn, functions of the back-end acoustic model parameters 208. This structure allows a simple application of the chain rule.

$$\frac{\partial F_r}{\partial \theta} = \sum_{t,s,l} \frac{\partial F_r}{\partial \ln p(x_t^r | s_t^r = s)} \frac{\partial \ln p(x_t^r | s_t^r = s)}{\partial \theta} \quad (3)$$

Here, r is an index into the training data. The tth observation vector in utterance r is identified by $x_t^r$. The back end acoustic model state at time t in utterance r is $s_t^r$. The first term in Eq. 3 captures the sensitivity of the objective function to individual acoustic likelihoods in the model. It can be shown to be equal to the difference of the conditional and unconditional posterior, with respect to the correct transcription. These are simply the flattened numerator and denominator terms that occur in standard lattice-based MMI estimation.

$$\frac{\partial F_r}{\partial \ln p(x_t^r | s_t^r = s)} = p(s_r^t = s | X_r, w_r) - p(s_t^r = s | X_r) \quad (4)$$

$$= \gamma_{rst}^{num} - \gamma_{rst}^{den}$$

The second term in Eq. 3 captures the sensitivity of individual likelihoods in the acoustic model with respect to the back end model parameters 206. In one example, only a mean parameter $\mu_s$ is updated. For this case, the second term of Eq. 3 is equal to the following, where the function $1(z)$ equals one, if and only if z is true.

$$\frac{\partial \ln p(x_t^r | s_t^r = s')}{\partial \mu_s} = \sum_s^{-1} (x_t^r - \mu_s) 1(s = s') \quad (5)$$

The gradient of the objective function F with respect to the mean parameter $\mu_s$ can be represented as:

$$\frac{\partial F}{\partial \mu_s} = \sum_{r,t} (\gamma_{rst}^{num} - \gamma_{rst}^{num}) \sum_s^{-1} (x_t^r - \mu_s)$$

To begin, the back-end acoustic model parameters 206 can first be trained with a standard maximum likelihood training regime. After convergence, method 300 can be applied.

The SPLICE transform for the front-end feature extraction parameters 204 is described in an article entitled "Evaluation of Splice on the Aurora Z and 3 Tasks", in Proc. ICSLP, 2002, pp. 453-456. SPLICE models the relationship between feature vectors y (distorted speech) and x (clean speech) as a constrained Gaussian mixture model (GMM), and then uses this relationship to construct estimates of x given observations of y.

Vector y can be a traditional feature vector based on static cepstra and its derivatives. It is further possible to expand y to include more context information, finer frequency detail, and/or other non-traditional features.

In one embodiment, no explicit constraints are placed on x, other than it represents a feature space that improves the objective function. One way of parameterizing the joint GMM on x and y is as a GMM on y, and a conditional expectation of x given y and the model state m.

$$p(y,m) = N(y; \mu_m, \sigma_m) \pi_m$$

$$E[x|y,m] = A_m y + b_m$$

The parameters $\lambda$ of this transformation are a combination of the means $\mu_m$, variances $\sigma_m$, and state priors $\pi_m$ of the GMM $p(y,m)$, as well as the rotation $A_m$ and offset $b_m$ of the affine transformation. The SPLICE transform $f(y; \lambda)$ can be defined as the minimum mean squared estimate of x, given y and the model parameters $\lambda$. In effect, the GMM induces a piecewise linear mapping from y to x.

$$x = f(y; \lambda) = E[x|y] = \sum_m (A_m y + b_m) p(m|y) \quad (6)$$

A simplified form of the SPLICE transformation can be used. That rotations $A_m$ are replaced with the identity matrix, and Eq. 6 reduces to:

$$f(y; \lambda) = y + \sum_m b_m p(m|y) \quad (7)$$

Computing the gradient of Eq. 2 with respect to the front-end parameters 204 can also be represented as a simple application of the chain rule. As seen previously, every $F_r$ is a function of many acoustic model state conditional probabilities $p(x_t^r|s_t^r)$. These are, in turn, functions of the front end transformed features $x_{it}^r$. And, each transformed feature is a function of the front end parameters $\lambda$.

$$\frac{\partial F_r}{\partial \lambda} = \sum_{t,s,i} \frac{\partial F_r}{\partial \ln p(x_t^r|s_t^r = s)} \frac{\partial \ln p(x_t^r|s_t^r = s)}{\partial x_{it}^r} \frac{\partial x_{it}^r}{\partial \lambda} \quad (8)$$

Here, r is an index into the training data. The tth observation vector in utterance r is identified by $x_t^r$. The scalar $x_{it}^r$ is the ith dimension of that vector. The back end acoustic model state at time t in utterance r is $s_t^r$.

The first term in Eq. 8 is identical to its counterpart in Eq. 3. The second term in Eq. 8 captures the sensitivity of individual likelihoods in the acoustic model with respect to the front end transformed features.

$$\frac{\partial \ln p(x_t^r|s_t^r = s)}{\partial x_t^r} = -\sum_s^{-1} (x_t^r - \mu_s) \quad (9)$$

Here, $\mu_s$ and $\Sigma_s$ are mean and variance parameters from the Gaussian component associated with state s in the back end acoustic model. The final term in Eq. 8 captures the relationship between the transformed features and the parameters of the front end. For the simplified SPLICE transform, only the offset parameters $b_m$ can be trained. For the uth element of the vector $b_m$:

$$\frac{\partial x_{it}^r}{\partial b_{um}} = \frac{\partial}{\partial b_{um}} (y_{ut}^r + \sum_{m'} b_{im'} p(m'|y_t^r))$$

$$= 1(i = u) p(m|y_t^r) \quad (10)$$

Combining Eqs. 1, 8, 4, 9 and 10, the complete gradient with respect to the vector $b_m$ is:

$$\frac{\partial}{\partial b_m} = -\sum_{r,t,s} p(m|y_t^r)(\gamma_{rst}^{num} - \gamma_{rst}^{den}) \sum_s^{-1} (x_t^r - \mu_s) \quad (11)$$

The SPLICE GMM can be trained from scratch using maximum likelihood (ML) re-estimation. To initialize the means, M vectors can be uniformly chosen from the training data. The variance structure are typically diagonal, initialized to unit covariance, and tied across all mixture components.

FIG. 4 illustrates an example of a suitable computing system environment 400. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The concepts presented herein are operational with numerous other general purpose or special purpose computing systems environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The concepts presented herein may be described in the general context of computer-executable instructions, such as program modules, being executed by a computer. Generally, program modules include routines, programs, objects, components, data structures, etc. that perform particular tasks or implement particular abstract data types. Tasks performed by the programs and modules are described below and with the aid of figures. Those skilled in the art can implement the description and figures as computer-executable instructions, which can be embodied on any form of computer readable media.

The concepts presented herein may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the invention includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media.

Computer storage media includes both volatile and nonvolatile, removable and non-removable media implemented in any method or technology for storage of information such as computer readable instructions, data structures, program modules or other data. Computer storage media includes, but is not limited to, RAM, RON, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 44G, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 490.

The computer 410 may operate in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:

accessing a plurality of parameters for a speech recognition module having a front-end feature extraction module that produces feature vectors from input speech that are provided to a decoder of the speech recognition module that utilizes a back-end acoustic model having acoustic model parameters to generate an output for the input speech, the plurality of parameters including feature extraction parameters used by the front-end feature extraction module and acoustic model parameters used by the back-end acoustic model;

accessing a plurality of training audio signals and corresponding text transcriptions for the training audio signals;

applying the plurality of training audio signals to the speech recognition module using the plurality of parameters and determining an output of the speech recognition module based on the training audio signals;
comparing the output of the speech recognition module and the corresponding text transcriptions;
applying an objective function to the speech recognition module, based on the comparison of the output of the speech recognition module and the corresponding text transcriptions, to determine an objective function value based on the plurality of parameters, wherein the objective function value is determined based on correct outputs for the training audio signals, and wherein applying the objective function further includes determining a gradient of the objective function with respect to each parameter of the acoustic model parameters and determining a gradient of the objective function with respect to each parameter of the feature extraction parameters;
using the gradients and the objective function value to jointly train the feature extraction parameters and the acoustic model parameters by adjusting at least one of the feature extraction parameters and at least one of the acoustic model parameters to increase the objective function value using a processor of the computer, wherein the front-end feature extraction module is trained using the objective function value and the gradients determined with respect to each parameter of the feature extraction parameters and the back-end acoustic model is trained using the objective function value and the gradients determined with respect to each parameter of the acoustic model parameters; and
providing an adjusted speech recognition module as a function of the adjustment of the at least one of the plurality of parameters.

2. The method of claim 1 and further comprising:
applying the objective function to the adjusted speech recognition module to determine an objective function value as a function of the adjusted parameters.

3. The method of claim 2 and further comprising:
adjusting the adjusted parameters.

4. A system for altering a speech recognition module adapted to identify words from a speech signal, comprising:
a set of training audio signals indicative of speech;
a set of training text transcriptions corresponding to text of the audio signals; and
a training module adapted to apply an objective function to the speech recognition module to determine a first objective function value based on a plurality of parameters for the speech recognition module, the plurality of parameters including feature extraction parameters and acoustic model parameters, and wherein the training module is adapted to jointly train the feature extraction parameters and acoustic model parameters based on the first objective function value, wherein the feature extraction parameters are utilized by a front-end feature extraction module of the speech recognition module to extract features from input speech, the extracted features being provided to a decoder that utilizes a back-end acoustic model having the acoustic model parameters to generate an output for the input speech, wherein the training module is further adapted to apply the objective function to the adjusted feature extraction parameters and the adjusted acoustic model parameters to determine a second objective function value as a function of the adjusted parameters, wherein the training module is further adapted to adjust the adjusted parameters based on the second objective function value.

5. The system of claim 4 wherein the training module is further adapted to determine a gradient of the objective function with respect to each parameter of the plurality of parameters and wherein adjusting at least one of the plurality of parameters is performed as a function of the gradients.

6. The system of claim 4 wherein the training module is further adapted to determine an output of the speech recognition module based on the training audio signals.

7. The system of claim 6 wherein the training module is further adapted to compare the output of the speech recognition module and the corresponding text transcriptions.

8. The system of claim 4 wherein the objective function value is determined based on a correct output given an audio signal.

9. A computer readable storage medium having instructions that, when implemented by a processor of a computer, identify words from a speech signal, comprising:
an input component adapted to receive the speech signal;
a speech recognition module adapted to receive the speech signal and identify words from the speech signal as a function of parameters using a processor of the computer, the parameters including feature extraction parameters and acoustic model parameters being jointly trained by an optimization function determined based on a set of audio signals and corresponding transcript text of the audio signals, wherein the feature extraction parameters are utilized by a front-end feature extraction module of the speech recognition module to extract features from the speech signal, the extracted features being provided to a decoder that utilizes a back-end acoustic model having the acoustic model parameters to generate an output for the speech signal, wherein the feature extraction and acoustic model parameters are jointly trained by determining a gradient of the optimization function with respect to each parameter of the plurality of parameters, adjusting at least one of feature extraction parameters and at least one of the acoustic model parameters as a function of the gradients, and applying the optimization function to the adjusted feature extraction parameters and the adjusted acoustic model parameters to determine an optimization function value as a function of the adjusted parameters; and
an output component adapted to provide an output of words based on the speech signal.

10. The computer readable medium of claim 9 wherein the parameters are established by determining an output of the speech recognition module based on the training audio signals.

11. The computer readable medium of claim 10 wherein the parameters are established by comparing the output of the speech recognition module and corresponding text transcriptions.

12. The computer readable medium of claim 9 wherein the optimization function value is determined based on a correct output given an audio signal.

* * * * *